US006944965B1

(12) United States Patent
Watamura

(10) Patent No.: US 6,944,965 B1
(45) Date of Patent: Sep. 20, 2005

(54) INLINE INDICATOR HOLDER

(76) Inventor: Abe Watamura, 2610 9th St., Berkeley, CA (US) 94710

( * ) Notice: Subject to any disclaimer, the term of this patent is extended or adjusted under 35 U.S.C. 154(b) by 22 days.

(21) Appl. No.: 10/959,617

(22) Filed: Oct. 6, 2004

(51) Int. Cl.$^7$ ............................................... G01B 3/22
(52) U.S. Cl. .................................................... 33/642
(58) Field of Search .......................... 33/642, 636, 637, 33/638, 639, 520, 613, 644, 556, 559

(56) References Cited

U.S. PATENT DOCUMENTS

| | | | |
|---|---|---|---|
| 990,605 A | * | 4/1911 | Stimson ........................ 33/642 |
| 1,723,529 A | * | 8/1929 | Schwieterman .............. 33/642 |
| 3,028,675 A | * | 4/1962 | Mahlmeister et al. ......... 33/642 |
| 3,029,520 A | * | 4/1962 | Reeves ......................... 33/642 |
| 3,432,932 A | * | 3/1969 | Hurick et al. ................. 33/642 |
| 3,531,867 A | * | 10/1970 | Viollet ......................... 33/642 |
| 4,437,803 A | | 3/1984 | Volna ......................... 409/218 |
| 5,036,595 A | | 8/1991 | Nevery ........................ 33/642 |
| 5,704,132 A | | 1/1998 | Bourne ........................ 33/628 |
| 6,032,381 A | * | 3/2000 | Miller ......................... 33/556 |

* cited by examiner

*Primary Examiner*—Christopher W. Fulton
(74) *Attorney, Agent, or Firm*—Kent Lembke, Esq.; Carol W. Burton, Esq.; Hogan & Hartson, LLP

(57) ABSTRACT

An indicator holder for holding and positioning an indicator, such as a dovetail dial test indicator. The indicator holder includes a mounting assembly for attaching the holder to a machining apparatus. The mounting assembly includes one or more connecting members and an eccentric offset member. The central axis of the offset member is offset a distance from the central axis of the connecting member, with the two axes being parallel. The indicator holder includes an upper arm that receives the offset member of the mounting assembly such that the upper arm can rotate about its axis to enable alignment or zeroing of an indicator mounted within the holder. The indicator holder has a slide plate pivotally connected to the upper arm and a lower arm pivotally attached to the slide plate, with the lower arm including a guide way receiving and retaining the mounting element of the indicator.

15 Claims, 5 Drawing Sheets

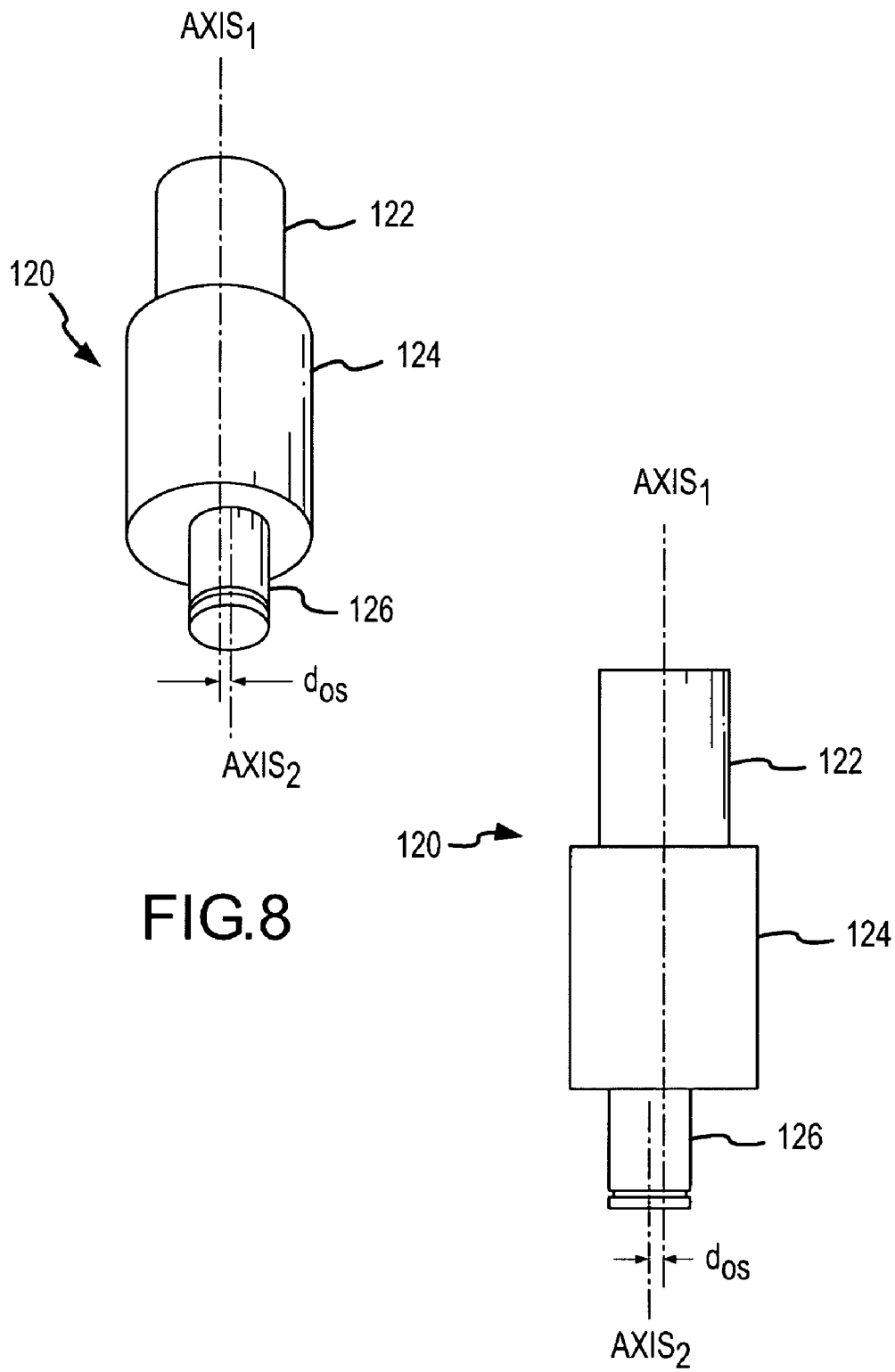

INLINE INDICATOR HOLDER

BACKGROUND OF THE INVENTION

1. Field of the Invention

The present invention relates generally to measuring devices used in precision machining and holders for such devices, and, more particularly, to a holder for dial test indicators for use with milling machines and the like. The holder is adapted for efficient alignment and/or zeroing of the indicators and for placement of the indicators in many positions to suit workpieces of different shapes and sizes.

2. Relevant Background

Precision machining requires that a machinist be able to repeatedly perform accurate measurements of varied surfaces on a workpiece. In many cases, performing these measurement before and after machining accounts for a large portion of the time required to machine a part or workpiece. In this regard, numerous measurement devices or indicators have been developed for use by machinists, and dial test indicators are an example of a measurement device that is used by a large percentage of machinists.

A number of different types of dial test indicators are commercially available. These devices typically include a body that supports a dial indicator which is interconnected with a sensor arm or element that terminates in a ball that is used to contact a surface of a workpiece. Generally, the sensor arm is pivotally movable relative to the body of the indicator so that various surfaces of the workpiece can be contacted during workpiece measurement and inspection operations.

Numerous indicator holders have been developed to hold the indicator and to mount the indicator to the machining tool, e.g., a milling machine, a drill press, and the like. While the prior art indicator holders provide for placement of the test indicator in a number of positions relative to the workpiece, many are of complex construction, are often difficult to use, and are often quite expensive. The complex construction often is evidenced with numerous parts, many of which are difficult to manufacture. The difficulty of use is caused by the use of multiple rods or other features that result in a holder that requires significant training or practice to use and often has limited versatility, i.e., may only be useful with a particular workpiece or for measuring a particular surface due to a limited range of motion.

There remains a need for an improved indicator holder that is inexpensive to produce while still meeting the machinist's demand for a holder that is easy to use and that can be maneuvered to position the holder in numerous positions relative to a machine and a workpiece.

SUMMARY OF THE INVENTION

To address the problems with prior indicator holders, the invention provides a dial test indicator holder for use with milling machines and the like that is specially adapted with an eccentric offset member that in use enables the dial test indicator to be quickly aligned and/or zeroed. The dial test indicator holder also is adapted for use with indicators having dovetail mounting elements to allow quick insertion of the indicator into the holder. The indicator holder is further adapted with multiple pivot points and a slide plate with positioning slot to provide built-in end stops. As a result, the indicator holder of the present invention is extremely versatile to use and enables adjustable positioning of the dial test indicator in numerous orientations relative to a workpiece. Further, the indicator holder is designed for inexpensive production with fewer components than required in prior indicator holders.

More particularly, an indicator holder is provided for holding an indicator, such as a dial test indicator with one or more dovetail mounting elements on its sides, inline or in alignment. The indicator holder includes a mounting assembly for attaching the holder to a machining apparatus, such as a vertical mill. The mounting assembly includes at least one connecting member, such as a particular diameter cylinder to be held with a collet, and an eccentric offset member. Within the mounting assembly, the central axis of the offset member is offset a distance, e.g., about $1/32$ inch, from the central axis of the connecting member, with the two axes being parallel or substantially parallel.

The indicator holder further includes an upper arm that receives the offset member of the mounting assembly such that the upper arm can rotate about its axis to enable alignment or zeroing of an indicator mounted within the holder. The indicator holder has a slide plate pivotally connected to the upper arm and a lower arm pivotally attached to the slide plate, with the lower arm including a guide way for receiving and retaining the mounting element of the indicator. The upper arm and the lower arm extend perpendicular from a side of the slide plate, and a guide way in the upper arm is positioned such that center axes of the two guide ways are coplanar. The slide plate includes an elongate, linear groove with two end stops in which the upper arm is pivotally positioned for 360-degree rotation and also for allowing linear movement of the slide plate relative to the upper arm.

BRIEF DESCRIPTION OF THE DRAWINGS

FIG. 8 is a perspective view of the mounting assembly of the indicator holder of FIGS. 1–3 showing the eccentric offset member of the invention; and FIG. 9 is a side view of the mounting assembly of FIG. 8.

DETAILED DESCRIPTION OF THE INVENTION

The invention is described in detail with reference to FIGS. 1–9. As shown, an indicator holder is provided that is particularly well suited for use with dial test indicators having dovetail mounting elements. The indicator holder as shown is fabricated with relatively few components while still providing two pivot points and a slide plate that enable a user to position a dial indicator in numerous positions at various orientations relative to a workpiece. The slide plate is useful for eliminating the need for additional stop elements and for increasing the strength and durability of the indicator holder. Additionally, the indicator holder includes a mounting assembly with an eccentric offset member that enables a user to quickly align or zero a dial indicator attached to the indicator holder to increase the accuracy of the indicator and provide for quicker use of the indicator for future uses. As will be explained in detail, once an indicator is zeroed or aligned with a indicator holder of the present invention few or no adjustments are required for future use of the indicator.

Figure 1:
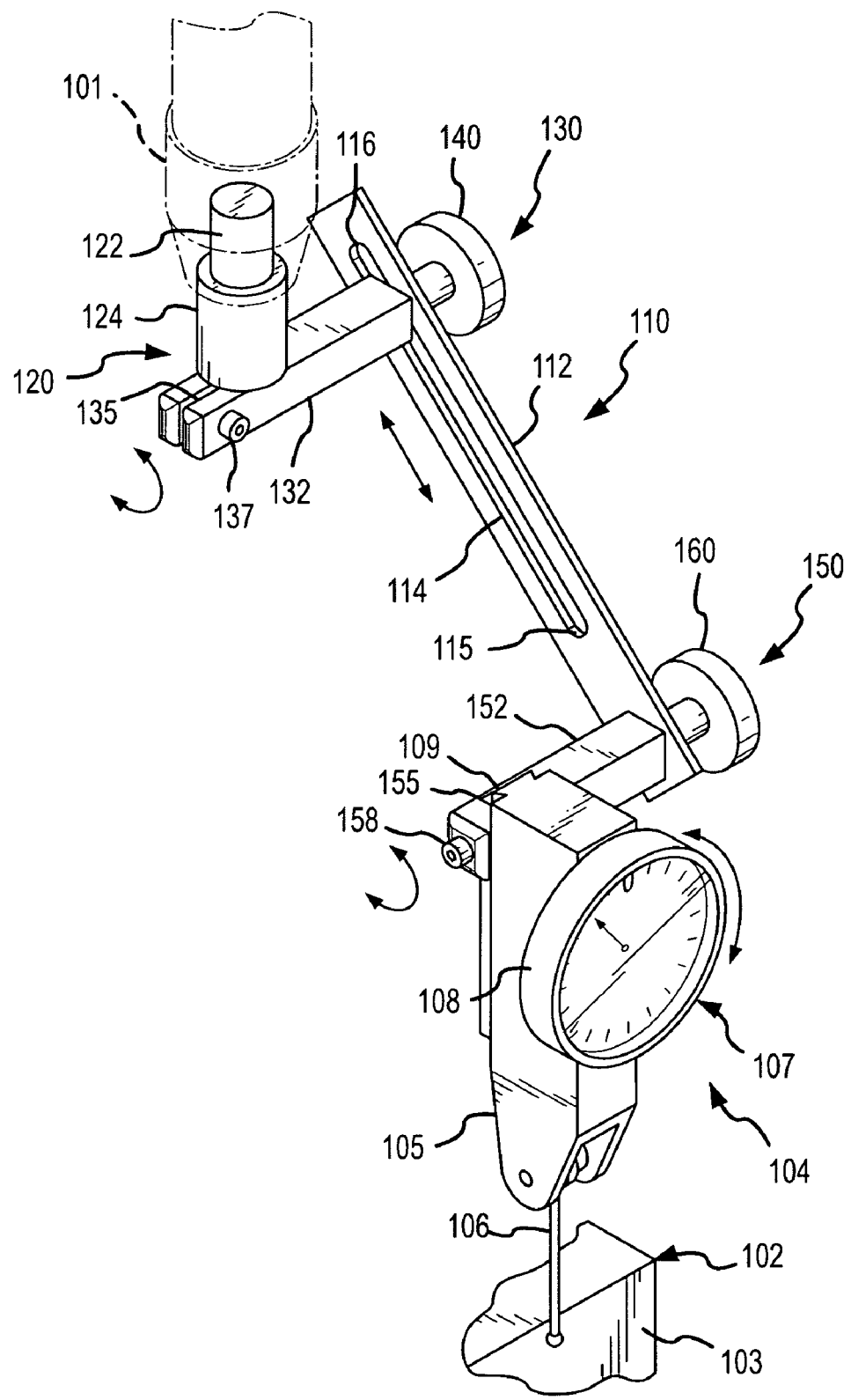
FIG. 1 is a perspective view of an indicator holder according to the invention holding a dial test indicator and mounted in a chuck or collet of a milling or other machine.
Figure 2:
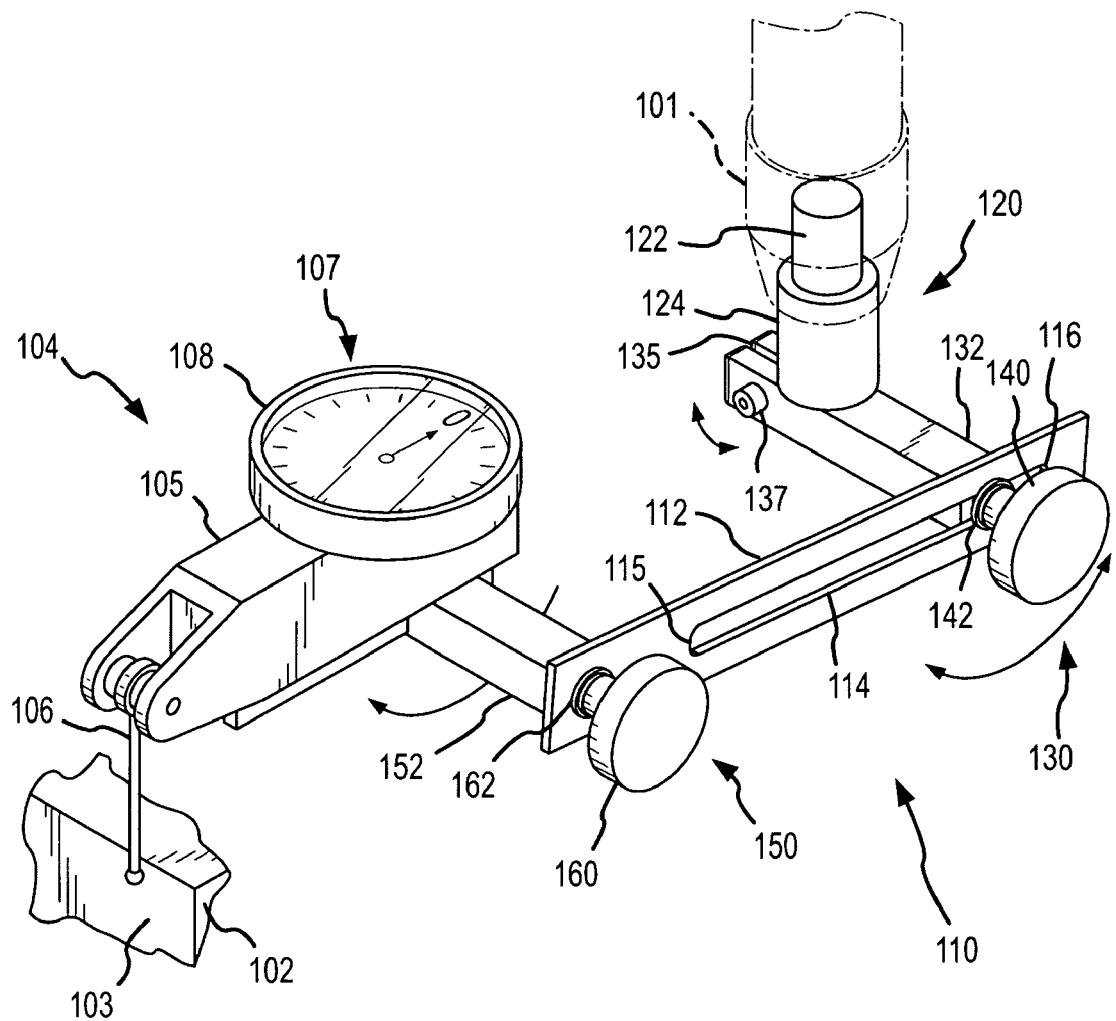
FIG. 2 is another perspective view of the indicator holder of FIG. 1 showing the holder in another position obtained by pivoting the slide plate and pivoting a lower arm.

FIGS. 1 and 2 illustrate perspective views of an indicator holder 110 of the present invention mounted for use in measuring surfaces of a workpiece 102 and particularly, a vertical side 103 of a block workpiece 102. As shown, the indicator holder 110 is mounted in a collet or chuck 101 of a machining device or other machine, such as a vertical milling machine or the like. A dial test indicator 104 is attached to the indicator holder 110 for selective positioning adjacent the workpiece 102. A variety of indicators 104 may be used with the holder 110 but typically such devices will include a dovetail mounting element 109 for ready attachment to the holder 110, as is explained in detail below. The indicator 104 as shown includes a body 105 to which a sensor element 106 with a ball for contacting a surface 103 to be tested or measured. The indicator 104 further includes a dial 107 that can be set or zeroed with radial knob 108 that can be turned in either direction.

To initially mount the indicator holder 110 on a machine, the collet 101 is loosened to receive a mounting assembly 120. Collets or chucks 101 may be adapted for receiving various sizes or diameter tools, e.g., ¼ inch, ⅜ inch, ½ inch, and the like (or similar steps in Metric units). As shown, the mounting assembly 120 includes a first connecting member 122 and a second connecting member 124 that each are cylindrical but with differing outer diameters (such as ⅜ inch and ½ inch OD). In other embodiments (not shown), additional steps or connecting members may be provided to allow the indicator holder to be used with a plurality of collet or chuck sizes. In other embodiments, only one connecting member 122, 124 is provided but in these embodiments, the collet or chuck 101 must be changed to fit the connecting member 122, 124 prior to its insertion in the collet 101. Once the connecting member 122 or 124 is inserted in the collet 101, the collet 101 is tightened to clamp onto the connecting member 122 or 124 and hold the holder 110 such as shown in FIGS. 1 and 2.

The indicator holder 110 further includes a slide plate 112 that in the embodiment shown is a rectangular plate with a linear guide or positioning slot 114. The slot 114 is closed with first and second ends or stops 115, 116 to limit or define the length of travel of upper arm assembly 130. The slide plate 112 is mounted to the upper arm assembly 130 (via post 138 shown in FIG. 3) such that the plate 112 can be pivoted and also such that the plate 112 can be moved relative to the upper arm assembly 130 along the positioning slot 114. This provides a significant amount of movement and versatility in positioning an indicator 104 attached to the other end of the slide plate 114, which can be seen on a small scale by the two positions of the slide plate 112 relative to the upper arm assembly 130 in FIGS. 1 and 2.

The upper arm assembly 130 includes a knob 140 and washers 142 that are mounted onto the upper arm assembly 130 (again, via post 138 shown in FIG. 3) and are kept loose until the indicator 104 is properly positioned relative to a workpiece 102 and then, the knob 140 is tightened to retain the desired position of the slide plate 112 (and attached lower arm assembly 150 and attached indicator 104). The upper arm assembly 130 further includes an arm 132 that extends transverse to the plate 112, e.g., substantially perpendicular from the plate 112. As shown, but not as a limitation, the arm 132 is formed from rectangular stock, such as an alloy steel to provide desired strength and spring characteristics. As shown in FIGS. 1 and 2, the mounting assembly 120 is attached to the arm 132 with slot 135 used to allow the arm 132 to receive the mounting assembly 120 and the screw 137 used to maintain the position of the arm 132 relative to the mounting assembly 120. As will be explained in detail below, the screw 137 is left loose to allow the holder 110 to be rotated slightly relative to the collet 101 to allow aligning or zeroing of the indicator 104 and once aligned or zeroed, the screw 137 is tightened to maintain the desired setting.

At the opposite end of the slide plate 112, a lower arm assembly 150 is pivotally mounted to the slide plate 112 (via a post 159 shown in FIG. 3) so as to provide 360 degrees of motion of the arm assembly 150 relative to the slide plate 112 (as is the case for the upper arm assembly 130). A knob 160 and washers 162 are provided for retaining the lower arm assembly 150 in a particular position or when loosened, allowing free rotation of the arm assembly 150 relative to the mounting point on the slide plate 112. The lower arm assembly 150 functions to hold the dial test indicator 104 and in this regard, includes an arm 152 that extends transverse to the slide plate 112, e.g., substantially perpendicular to the plane of the plate 112 as shown. As will be described with reference to FIG. 3, the arm 152 is receives the dovetail mounting element 109 of the indicator 104 and is spring loaded, in part due to spring element 155, to receive the element 109 which can be slid within the arm 152 or is slidably mounted. When positioned as desired relative to the arm 152, the screw 158 is tightened.

As shown and described with reference to FIGS. 1 and 2, the indicator holder 110 provides versatility in positioning an indicator. First, the indicator 104 itself can be mounted on any side having a dovetail mounting assembly 109 and can be slid (e.g., perpendicular to the arm 152) within the arm 152 and then fixed in that position. The lower arm 152 can be rotated 360 degrees about its mounting point or axis on the slide arm 112 and then retained with knob 160 in a desired position. The slide plate 112 can be positioned relative to a central axis of the upper arm 132 by loosening the knob 140 and in this fashion, a distance between the lower arm 152 and the upper arm 132 can be selected, such as to suit a size of a workpiece 102 or position of surface 103. The slide plate 112 can also be rotated 360 degrees relative to the central axis of the upper arm 132, and once in a desired position, the knob 140 can be tightened. Additionally, the entire holder 110 can be moved by rotating the collet 101. Further, prior to setting the screw 137 in the upper arm assembly 130, the indicator holder 110 can be rotated about the fixed mounting assembly 120 so as to align or zero the indicator 104.

Figure 3:
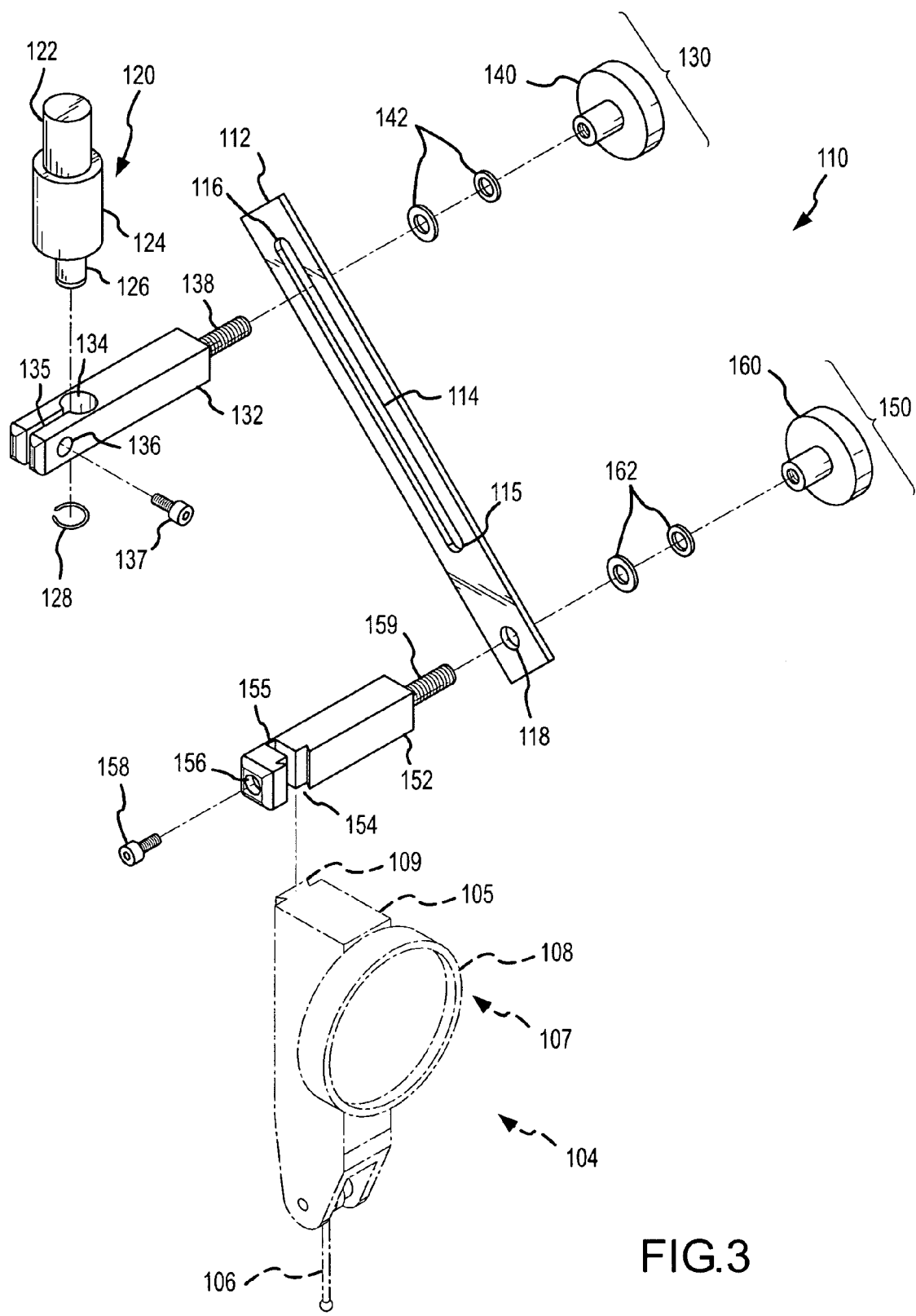
FIG. 3 is an exploded perspective view of the indicator holder of FIGS. 1 and 2.
Figure 4:
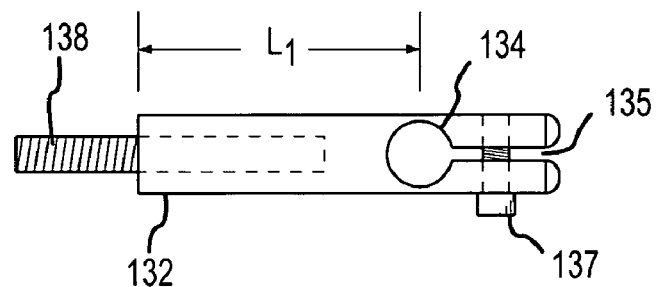
FIGS. 4–7 are top and side views of the upper arm and the lower arm of the indicator holders of FIGS. 1–3.
Figure 5:
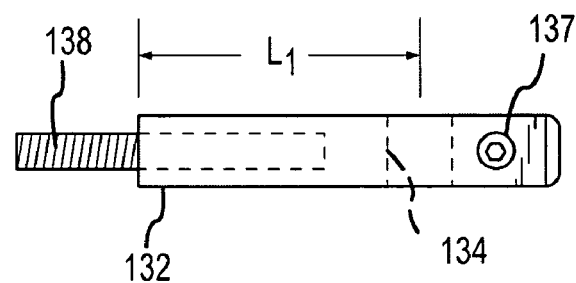
Figure 6:
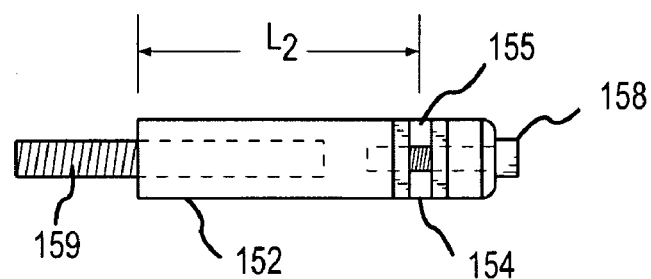
Figure 7:
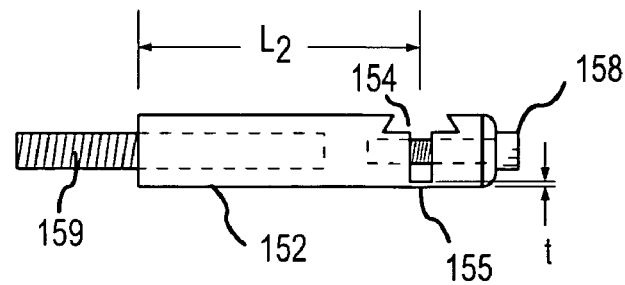

FIG. 3 provides an exploded view of the indicator holder 110, which more clearly shows its features. As shown, the slide plate 112 includes the positioning or guide slot 114 with end stops 115, 116 and also includes the mounting hole 118 for receiving post 159 of lower arm assembly 150. The plate 112 may take many forms to practice the invention including not being limited to a rectangular shape. The length of the slot 114 may be varied, the position of the hole relative to the guide slot 114 may also be varied but is generally selected to provide a separation to avoid interference between an indicator 104 in the arm 152 and the arm 132, and the overall length of the plate 112 may vary to suit differing workpieces 102. In one embodiment, the plate 112 has a length selected from the range of 3 to 10 inches and more preferably, from about 3 inches to about 5 inches, a width of less than about 1 inch and more preferably, less than about 0.5 inches, and a thickness of less than about ⅜ inch and more preferably, less than about ¼ inches.

The mounting assembly 120 is an important feature of the invention that enables quick alignment or zeroing of an indicator 104. As shown in FIG. 3, the mounting assembly 120 includes a first connecting member 122 with a first OD and a second connecting member 124 with a second, larger OD. The mounting assembly 120 further includes an eccentric offset member 126 that is used both for mounting the indicator holder 110 to a machine and for enabling alignment or zeroing operations to be quickly completed. The eccentric offset member 126 is received in a guide way or opening 134 in upper arm 132 and is prevented from sliding off the arm 132 by retaining ring 128. The guide way 134 is typically selected to have substantially the same inner diameter (ID) or smaller as the OD of the member 126 and slot 135 is provided in arm 132 to allow the member 126 to be inserted in the arm 132 (e.g., the guide way 134 is spring loaded so as to allow the guide way 134 to be expanded or enlarged to receive the member 126 but to resist by spring forces such expansion). The screw 137 is left loose until after alignment or zeroing is completed, and then is tightened.

FIGS. 8 and 9 illustrate the mounting assembly 120 in more detail. As shown, the connecting members 122 and 124 are aligned with a single central axis, $axis_1$. However, the eccentric offset member 126 that is connected to the upper arm 134 has a different central axis, $axis_2$, that is offset a distance, $d_{os}$, from the central axis, $axis_1$, of the connecting members 122, 124. The offset distance, $d_{os}$, may vary to practice the invention, and in one embodiment, is 1/32 inch, and is selected to provide an eccentric rotation of the indicator holder 110 relative to the axis of the collet 101 and connecting members 122, 124. This eccentric rotation enables quick alignment or zeroing of an indicator mounted on lower arm 152, as explained below. The dimensions of the mounting assembly 120 may vary, but in exemplary embodiment, the first connecting member 122 has an OD of 3/8 inch and a length of less than about 1/2 inch, the second connecting member 124 has an OD of 1/2 inch and a length of less than about 3/4 inch, and the eccentric offset member 126 has an OD of less than about 1/4 inch and a length of less than about 1/2 inch.

In FIG. 3, the indicator holder 110 is shown to include the upper arm assembly 130 and the lower arm assembly 150 that work in combination with the slide plate 112 to hold and position an indicator 104 relative to both a chuck or collet that mates with mounting assembly 120 and a workpiece. The upper arm 132 includes threaded post 138 for mating with the positioning slot 114 of slide plate 112, and the lower arm 152 includes threaded post 159 for mating with the hole 118 of plate 112. The threaded posts 138, 159 also mate with washers 142, 162 and knobs 140, 160, and during use, the arms 132, 152 are allowed to rotate about an axis of the posts 138, 159 until the knobs 140, 160 are tightened. The lower arm 152 includes dovetail groove or guide way 154 for receiving the dovetail mounting element 109 of indicator 104. The dovetail guide way 154 is similar to the connecting member guide way 134 in upper arm 132 in that it is spring loaded to allow slight expansion to receive the element 109 which has similar outer dimensions as the guide way 154 interior dimensions but resist such expansion with spring forces that assist holding the indicator 104 in position within the arm 152 but allow movement for easy positioning. The spring force is provided by the material of the arm, e.g., an alloy steel or the like, and by the thickness of the spring element 155. Once properly positioned, the screw 158 in hole 156 is tightened to decrease the size of dovetail guide way 154 and hold the indicator 104 tightly in place in the holder 110.

FIGS. 4–7 illustrate the upper and lower arms 132, 152 in more detail. The indicator holder 110 is configured for allowing alignment and zeroing of an indicator 104 held by the lower arm 152. In this regard, the dovetail element 109 of the indicator 104 is "centered" by the manufacturer with the ball of the sensor element 106. However, typically, there is some error or tolerance that must be accounted for by the user of the indicator 104 such as with the alignment or zeroing provided by the holder 110. In this regard, the holder 110 is configured such that the dovetail element 109 held within arm 152 is aligned with the central axis of the eccentric offset member 126 when it is positioned in the upper arm 132 (i.e., the center axis of the offset member 126 is in a plane passing through the center of the dovetail element 109).

To this end, the center of guide way 134 in the upper arm 132 is positioned a first length, $L_1$, from the end of the arm 132 that abuts the slide plate 112, and likewise, the center of the dovetail guide way 154 is positioned a second length, $L_2$, from the end of the lower arm 152 that abuts the slide plate 112, with the first and second lengths, $L_1$ and $L_2$, being substantially equal, e.g., less than about 2 inches and in one case, about 1 inch.

The spring loaded or spring force mounting features of the invention are provided by the slot 135 in upper arm 132 and by the spring element 155 of lower arm 152. The dimensions of the guide ways 134 and 154 are selected to be about the outer dimensions of the eccentric offset member 126 and dovetail element 109. The slot 135 may have varying thickness to provide a desired spring force or resistance to increasing the size of the guide way 134 and may vary depending on the material used to form the arm 132. In one embodiment, the slot 135 is about 1/32 inch thick. Likewise, the thickness, t, of the spring element 155 may be varied to practice the invention and will vary with the material used to form lower arm 152 and the width or size of the dovetail guide way 154. In one embodiment, the thickness, t, is less than about 0.1 inches and more preferably, less than about 0.06 inches.

Referring again to FIGS. 1–3, it may now be useful to briefly describe the alignment or zeroing process that can be achieved with the use of the indicator holder 110 with its eccentric offset member 126. During use, an indicator 104 is mounted onto the lower arm 152 by sliding the dovetail element 109 into the dovetail guide way 154 until placed in a desired position at which point the set screw 158 is tightened. A workpiece 102 is positioned in a machining device, such as a vertical mill, and the tool holder 110 is mounted into a chuck or collet 101 that clamps onto either of the connecting members 122, 124. The indicator holder 110 is then manipulated, such as by rotating about posts 138, 159 and/or moving slide plate 112, to position the sensor element 106 of indicator 104 against a desired work surface 103. The screw 137 is left loose so that the upper arm 132 can be rotated eccentrically about the center axis, axis 2, of the eccentric offset member 126 a small amount, such as about 5 degrees, back and forth (clockwise and counter-clockwise) to align the indicator 104. The radial knob 108 of the dial 107 can then be adjusted to zero the indicator 104. Once aligned and/or zeroed, the set screw 137 is tightened to maintain this setting. In this manner, when the indicator 104 is again used with the holder 110, the alignment or zeroing process does not have to be repeated. In this manner, the holder 110 allows a user to get a fine offset measurement for a particular indicator 104, which is important for dial test indicators and the like in which the sensor element 106 may be "off" alignment with the mounting element 109 by a few thousandths of an inch.

The above disclosure sets forth a number of embodiments of the present invention. Other arrangements or embodiments, not precisely set forth, could be practiced under the teachings of the present invention and as set forth in the following claims.

What is claimed is:

1. An indicator holder for holding an indicator inline or in alignment having at least one mounting element, comprising:
   a mounting assembly for attaching the indicator holder to a machining apparatus, the mounting assembly comprising a connecting member for mating with the machining apparatus and an offset member, a central axis of the offset member being substantially parallel to and offset a distance from a central axis of the connecting member;
   an upper arm receiving the offset member of the mounting assembly such that the upper arm can be rotated about the central axis of the offset member;
   a slide plate pivotally connected to the upper arm; and
   a lower arm pivotally attached to the slide plate, the lower arm comprising a guide way for receiving the mounting element of the indicator.

2. The indicator holder of claim 1, wherein the upper arm and the lower arm extend substantially perpendicular from one side of the slide plate.

3. The indicator holder of claim 2, wherein the slide plate includes an elongate, linear groove in which the upper arm is pivotally positioned, whereby the slide plate can be moved linearly relative to the upper arm.

4. The indicator holder of claim 2, wherein the upper arm comprises a guide way for receiving the offset member, the upper arm guide way being configured to apply a retaining force against the offset member.

5. The indicator holder of claim 4, wherein the upper arm further comprises an open slot adjacent the guide way defining the retaining force and means for setting the position of the offset member relative to the upper arm, whereby the rotation of the upper arm is prevented when the position is set.

6. The indicator holder of claim 4, wherein the guide way in the upper arm and the guide way in the lower arm are aligned such that center axes of the guide ways are coplanar.

7. The indicator holder of claim 1, wherein the offset distance is less than about ¼ inch.

8. The indicator holder of claim 1, wherein the lower arm comprises a spring element adjacent the guide way in the lower arm, the spring element defining a spring force applied against the mounting element of the indicator, and wherein the guide way in the lower arm is a channel with interior surfaces defining a dovetail cross section.

9. An indicator holder for holding and positioning a dial test indictor holder having a mounting element with a dovetail cross section relative to a machining apparatus, comprising:
   means for mating with the dovetail cross section of the mounting element of the dial test indicator;
   means for positioning the mating means in a plurality of positions relative to the machining apparatus; and
   means for attaching the positioning means to a collet or a chuck of the machining apparatus, the attaching means comprising a connecting member for mating with the collet or the chuck and an offset member, a central axis of the offset member being substantially parallel to and offset a distance from a central axis of the connecting member, wherein the positioning means comprises an upper arm receiving the offset member such that the upper arm can be rotated about the central axis of the offset member, the offset member and the connecting member being integrally formed.

10. An indicator holder for holding and positioning a dial test indictor holder having a mounting element with a dovetail cross section relative to a machining apparatus, comprising:
    means for mating with the mounting element of the dial test indicator;
    means for positioning the mating means in a plurality of positions relative to the machining apparatus, wherein the positioning means comprises:
       an upper arm receiving the offset member such that the upper arm can be rotated about the central axis of the offset member;
       a slide plate pivotally connected to the upper arm; and
       a lower arm pivotally attached to the slide plate and
    means for attaching the positioning means to a collet or a chuck of the machining apparatus, the attaching means comprising a connecting member for mating with the collet or the chuck and an offset member, a central axis of the offset member being substantially parallel to and offset a distance from a central axis of the connecting member.

11. The indicator holder of claim 10, wherein upper arm can be rotated 360 degrees and the lower arm can be rotated 360 degrees.

12. The indicator holder of claim 10, wherein the upper arm and the lower arm extend substantially perpendicular from one side of the slide plate and wherein the slide plate includes an elongate, linear groove with opposing end stops in which the upper arm is pivotally positioned, whereby the slide plate can be moved linearly relative to the upper arm.

13. The indicator holder of claim 10, wherein the lower arm comprising a guide way with a interior surfaces defining a dovetail cross section for receiving the mounting element of the indicator.

14. The indicator holder of claim 10, the upper arm comprising a guide way for receiving the offset member, wherein the guide way in the upper arm and the guide way in the lower arm are aligned such that center axes of the guide ways are coplanar.

15. The indicator holder of claim 14, the upper arm guide way being configured to apply a retaining force against the offset member, wherein the upper arm further comprises an open slot adjacent the guide way defining the retaining force and means for rigidly setting the position of the offset member relative to the upper arm, whereby the rotation of the upper arm is prevented when the position is set.

\* \* \* \* \*